United States Patent [19]

Kobayashi

[11] Patent Number: 4,765,285

[45] Date of Patent: Aug. 23, 1988

[54] INTAKE SYSTEM FOR INTERNAL COMBUSTION ENGINE

[75] Inventor: Manabu Kobayashi, Itawa, Japan

[73] Assignee: Yamaha Hatsudoki Kabushiki Kaisha, Iwata, Japan

[21] Appl. No.: 893,671

[22] Filed: Aug. 6, 1986

[30] Foreign Application Priority Data

Aug. 7, 1985 [JP] Japan .................................. 60-172375
Aug. 7, 1985 [JP] Japan .................................. 60-172376

[51] Int. Cl.⁴ ........................................... F02B 27/02
[52] U.S. Cl. .............................. 123/52 M; 123/52 MB
[58] Field of Search ........................ 123/52 M, 52 MB

[56] References Cited

U.S. PATENT DOCUMENTS 4,617,897 10/1986 Sasaki et al. ................... 123/52 MB
4,643,136 2/1987 Ura et al. ........................ 123/52 M
4,669,428 6/1987 Ichida et al. .................... 123/52 MB

FOREIGN PATENT DOCUMENTS 0213921 12/1984 Japan .
0226515 10/1986 Japan .
2160264 12/1985 United Kingdom ............ 123/52 M Primary Examiner—Willis R. Wolfe, Jr.
Assistant Examiner—M. Macy
Attorney, Agent, or Firm—Ernest A. Beutler

[57] ABSTRACT

Several embodiments of induction systems for internal combustion engines wherein a first, relatively long intake passage and a second, relatively short intake passage, serve each combustion chamber. A throttle valve arrangement is incorporated so that the shorter intake passages only serve the combustion chamber at high speed for high speed tuning. Each of the intake passages receives its charge from respective plenum chamber and there is only one air inlet device for delivering atmospheric air to one of the plenum chambers. The other plenum chamber is charged from the first plenum chamber either through a direct conduit or through the shorter intake passages.

3 Claims, 4 Drawing Sheets

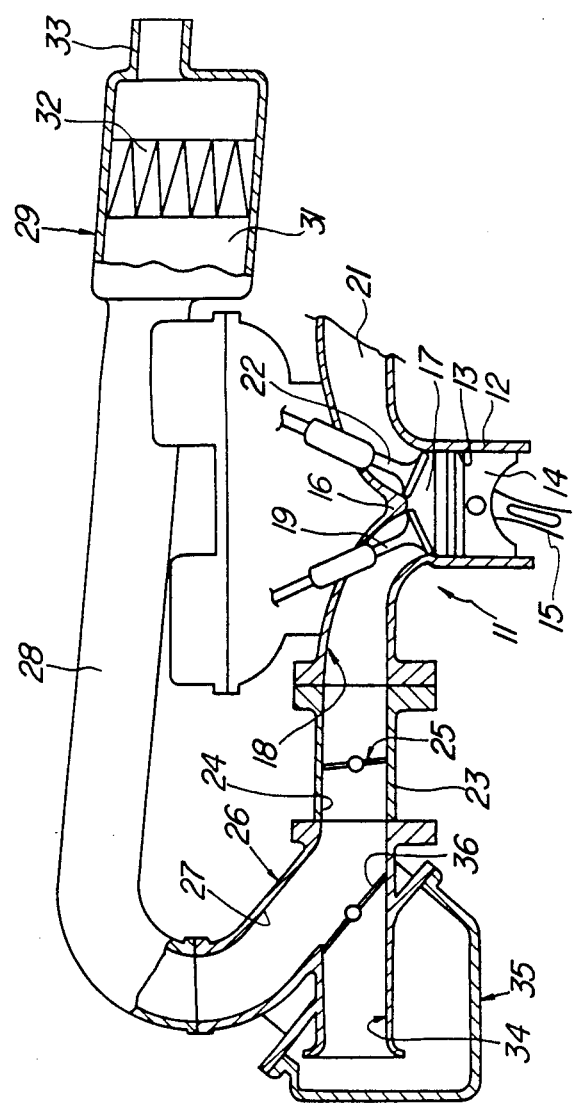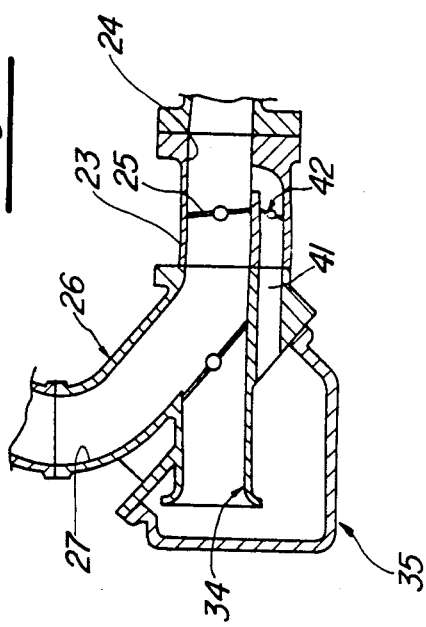

INTAKE SYSTEM FOR INTERNAL COMBUSTION ENGINE

BACKGROUND OF THE INVENTION

This invention relates to an intake system for an internal combustion engine and more particularly to an improved, compact and high efficiency intake system for an internal combustion engine that improves the running of the engine throughout its entire load and speed ranges.

In copending application Ser. No. 845,576, entitled "Intake System For Internal Combustion Engine", filed Mar. 28, 1986 in the names of Manabu Kobayashi, Kazutoshi Suzuki and Takeo Kondo, and assigned to the assignee of this application, still pending, there is disclosed an induction system for an internal combustion engine that is designed to provide improved running through the entire engine load and speed ranges. This is achieved by providing, in essence, two separate induction systems for each chamber of the engine. One induction system is relatively long and may be tuned for good low speed running while the other is relatively short and is tuned for good high speed running. A throttle valve arrangement is incorporated so as to insure that the proper induction system serves the combustion chamber under all running conditions. Each induction system is provided with its own plenum chamber and a separate atmospheric air inlet is provided to each plenum chamber. Although this type of induction system well achieves the desired results, the use of two separate plenum chambers and two separate air intakes requires the use of two separate air filters and thus can substantially increase the size of the engine and particularly its intake system. In addition, this provides servicing difficulties for the owner since the owner must service two air filter elements.

It is, therefore, a principal object of this invention to provide an improved induction system for an internal combustion engine that will improve performance throughout the entire speed and load ranges and which is, nevertheless, compact.

It is a further object of this invention to provide a high efficiency induction system for an internal combustion engine having a dual intake device which necessitates only a single air cleaner and air inlet.

SUMMARY OF THE INVENTION

A first feature of this invention is adapted to be embodied in an induction system for an internal combustion system having a combustion chamber. A first intake passage having a first effective length serves the combustion chamber and a second intake passage having a second effective length also serves the combustion chamber. The first induction passage communicates at its inlet end with a first plenum chamber and the second induction passage communicates at its inlet end with a second plenum chamber. The effective length of the induction passages is defined by the length between the inlet to the respective plenum chamber and the combustion chamber. Means are provided for delivering atmospheric air only to one of the plenum chambers directly.

Another feature of the invention is adapted to be embodied in an internal combustion engine having a combustion chamber and first and second different effective length intake passages serving the combustion chamber. In accordance with this feature of the invention, the first and second intake passages each have respective inlet ends and atmospheric air is supplied from a common air filter to both of the inlet ends of the respective intake passages.

BRIEF DESCRIPTION OF THE DRAWINGS

FIG. 1 is a partially schematic side elevational view, with portions broken away and shown in section, of a multi-cylinder internal combustion engine constructed in accordance with a first embodiment of the invention.

FIG. 3 is a partial cross-sectional view, in part similar to FIG. 1, showing a second embodiment of the invention.

DETAILED DESCRIPTION OF THE PREFERRED EMBODIMENTS

Figure 2:
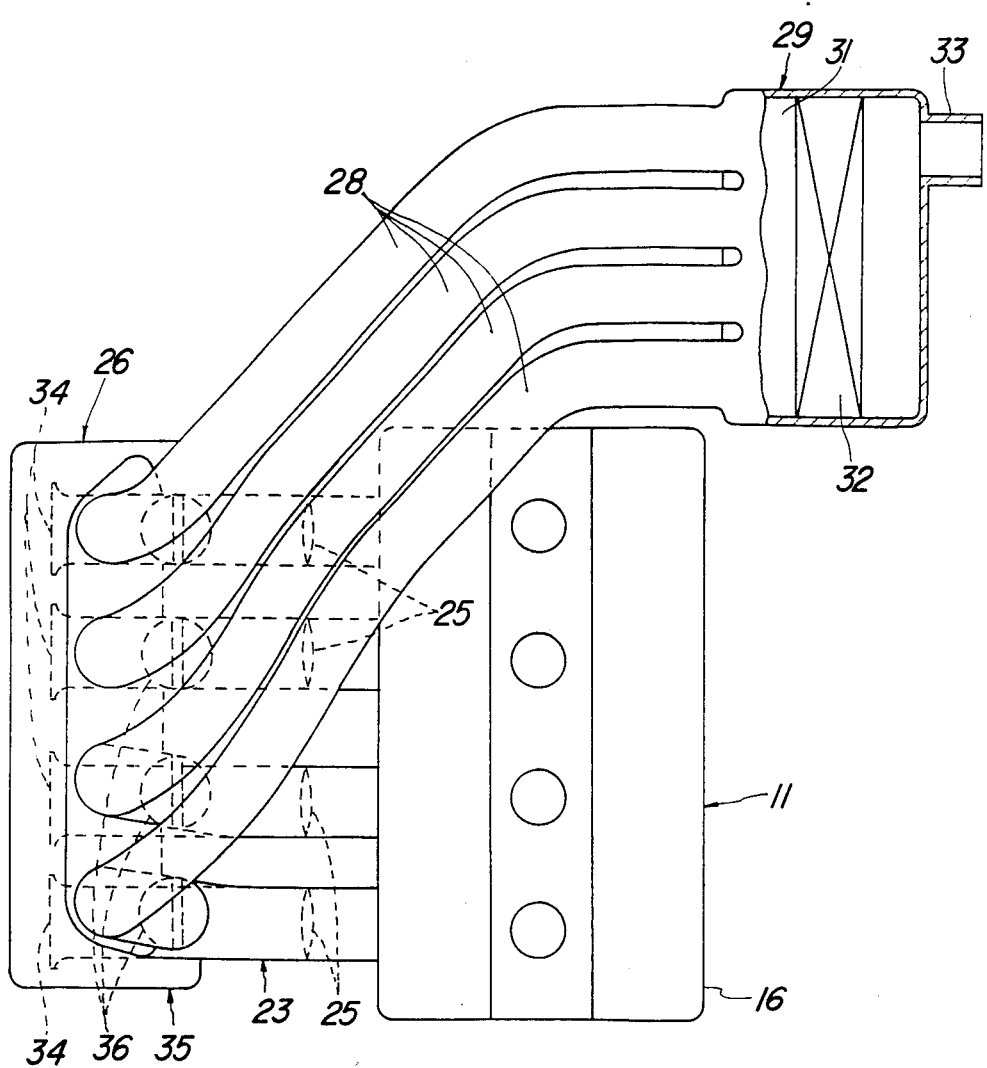
FIG. 2 is a top plan view of the first embodiment.

Referring first to FIGS. 1 and 2, an internal combustion engine constructed in accordance with this embodiment is identified generally by the reference numeral 11. In the illustrated embodiment, the engine 11 is of the four cylinder inline type but it is to be understood that the invention may be utilized in conjunction with other engine configuration or, in fact, for engines other than those of the reciprocating type. For a reason which will become apparent, however, the invention has particularly utility with engines having two or more combustion chambers that fire alternatively.

Since the invention is directed primarily to the induction system for the engine 11, only those other components of the engine which are necessary to understand the construction and operation of the engine have been illustrated and will be described in detail. Where any component of the engine is not described in detail, it may be considered to be conventional.

The engine 11 includes a cylinder block 12 in which cylinder bores 13 are formed. Pistons 14 reciprocate in the cylinder bores 13 and are connected by means of connecting rods 15 to a crankshaft. Preferably, the crankshaft is designed so that the respective cylinders of the engine fire alternatively in any suitable and well known firing order.

A cylinder head 16 is affixed to the cylinder block 12 in a known manner and has respective cavities 17 that cooperate with the pistons 14 and cylinder bores 13 to form chambers of variable volume, which chambers are at times referred to as the combustion chamber.

The engine 11 is provided with an induction system including an intake passage 18 that is formed in the cylinder head 16 and which terminates at an intake port, the flow through which is controlled by a poppet type valve 19, which is actuated in a known manner. In additional, an exhaust passage 21 is formed in the cylinder head extending from each combustion chamber 17 to an exhaust manifold (not shown) for discharge of the exhaust gases to the atmosphere in a known manner. The flow through the exhaust passages 21 is controlled by poppet type exhaust valves 22, which like the intake valves are operated in a known manner.

Although the invention is described in conjunction with an engine having only one intake valve and one exhaust valve per combustion chamber, it is to be understood that the invention may be equally as well practiced with engines having either or both multiple intake and multiple exhaust valves.

A throttle body 23 is affixed to the intake side of the cylinder head 16 in a known manner and provides individual intake passages 24 that are aligned with the cylinder head intake passages 18 and in which throttle valves 25 are supported on a throttle valve shaft. The throttle valves 25 are all affixed to the throttle valve shaft so that they will be operated in unison and a suitable accelerator linkage (not shown) is provided for operating the throttle valves 25.

An intake body, indicated generally by the reference numeral 26 is affixed to the throttle body 23 and forms a series of first intake passages 27 which cooperate with the intake passages 24 of the throttle body 23. Each of the intake passages 27 cooperates with a respective further intake pipe 28 and the intake pipes 28 all extend into an air intake device 29. The air intake device 29 comprises an air cleaner and defines a plenum chamber 31 in which an air filter element 32 is supported. An atmospheric air inlet 33 is formed on the opposite side of the filter 32 for permitting atmospheric air to enter the induction system. It should be noted that the intake passage comprised of the cylinder head intake passage 18, throttle body intake passage 24, inlet device intake passage 27 and intake pipes 28 are generally of a U-shaped configuration and have quite a long length. The effective length of this intake passage is the distance between the opening of the conduits 28 into the plenum chamber 31 and the intake ports in which the intake valves 19 are provided. This length is chosen so as to be tuned for good low speed running.

The intake device 26 is also provided with a plurality of high speed intake passages 34 that emanate from a point adjacent where the intake passages 27 join the throttle body intake passages 24. The passages 34 have their inlet ends opening into a plenum chamber, indicated generally by the reference numeral 35 which plenum chamber may be formed conveniently within the intake device 26. The intake passages 34 cooperate with the throttle body intake passages 24 and cylinder head intake passages 18 to provide a relatively short high speed intake passage. The effective length of this high speed intake passage is equal to the distance between the opening of the intake passages 34 into the plenum chamber 35 and the point where the cylinder head intake passages 18 meet the intake valves 19. This length is tuned to provide good high speed running.

A plurality of throttle valves 36 are supported in the intake device 26 at the point where the intake passages 34 merge with the intake passages 27. The throttle valves 36 are all affixed to a common throttle valve shaft and are operated either by means of an automatic operator or by means of a linkage system with the throttle valves 25 so that the throttle valves 36 will remain closed during low and medium speed running. The throttle valves 36 are then opened progressively and rapidly as the engine reaches its high load and high output running.

It should be noted that the plenum chamber 35 does not have a separate atmospheric air inlet. However, at such times as when the engine is running under high speed and inducting a charge from the intake passages 34 and plenum chamber 35, the plenum chamber 35 will be replenished with atmospheric air from the inlet device 29, conduits 28 and passages 27 through the open throttle valves 36 of the cylinders which are not on an intake cycle. This is the reason why alternate firing of the cylinders is desired. Thus, all of the intake air for low and high speed running will be inducted through the air filter element 32 and there need only be one element for servicing. Furthermore, the complexity of the induction system is substantially simplified from the prior art type of devices as aforementioned.

FIG. 3 shows another embodiment of the invention which is generally similar to the embodiment of FIGS. 1 and 2 and components which are the same as that embodiment have been identified by the same reference numerals and will not be described again in detail. In addition to providing separately tuned high and low speed intake passages, this embodiment incorporates an arrangement for improving low speed running by reducing pulsations in the intake system under this condition and also by increasing turbulence to the induction system and combustion under low engine speeds which has been found to provide rapid flame propagation in the combustion and good combustion under this severe running condition.

Referring now specifically to the embodiment of FIG. 3, the throttle body 23 and intake device 26 are provided with a plurality of relatively small auxiliary intake passages 41 that communicates with the throttle body 23 downstream of the throttle valve 25 and which communicates at their inlet ends with the plenum chamber 35. A throttle valve 42 is provided in each auxiliary passage 41 for controlling the flow through this passage. The throttle valve 42 is mechanically coupled or automatically controlled with the primary throttle valves 25 so that they will be opened at low speeds and closed at high speeds.

In additional to providing the low and high speed tuning as the embodiment of FIGS. 1 and 2, the auxiliary passages 41, plenum chamber 35 and throttle valves 42 cooperate as follows. When the throttle valves 42 are opened ad the engine is running at low speed, there will be negative pressure created in the plenum chamber 35 when the intake valve of the given cylinder is opened. When the intake valve closes, the induction air will continue to flow through the low speed intake passage and back into the plenum chamber 35 through the passages 41. Thus, inertia in the intake charge is overcome. In addition, once the intake valve next opens, this charge will issue from the plenum chamber 35 and auxiliary intake passage 41 into the throttle body intake passages 24 in close proximity to the combustion chamber so as to generate a high velocity charge that will increase turbulence in not only the induction system but also in the combustion chamber 17. This high velocity charge has been found to increase the turbulence in the combustion chamber sufficiently so as to promote rapid flame travel and good flame propagation. As a result, substantially better fuel economy and exhaust emission control is accomplished through the use of such a device.

Figure 4:
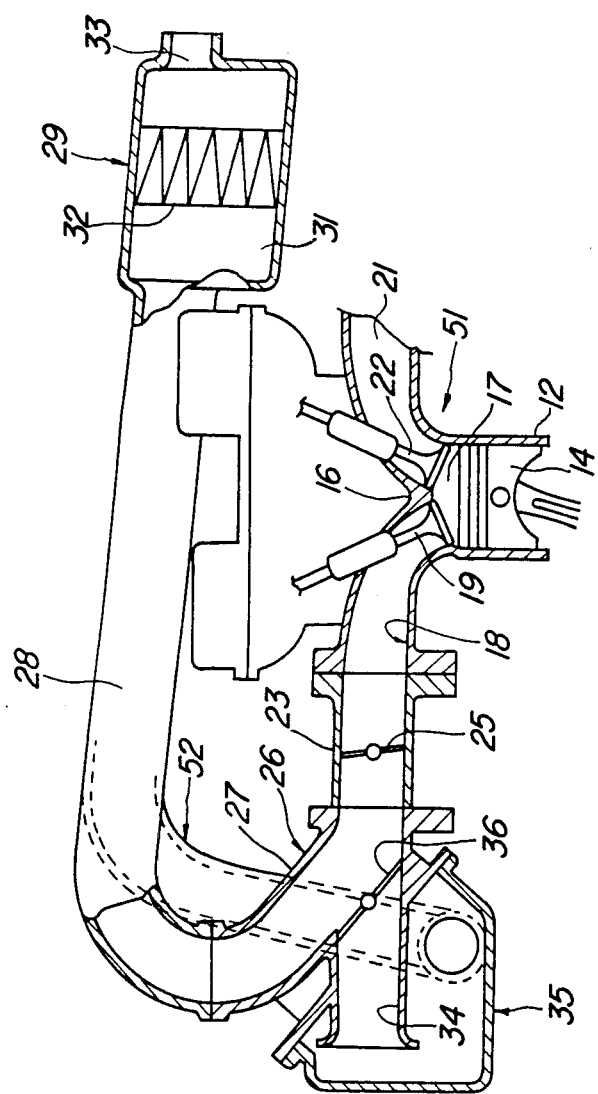
FIG. 4 is a partially schematic side elevational view, with portions broken away and other portions shown in section, in part similar to FIGS. 1 and 3, and shows a third embodiment of the invention.
Figure 5:
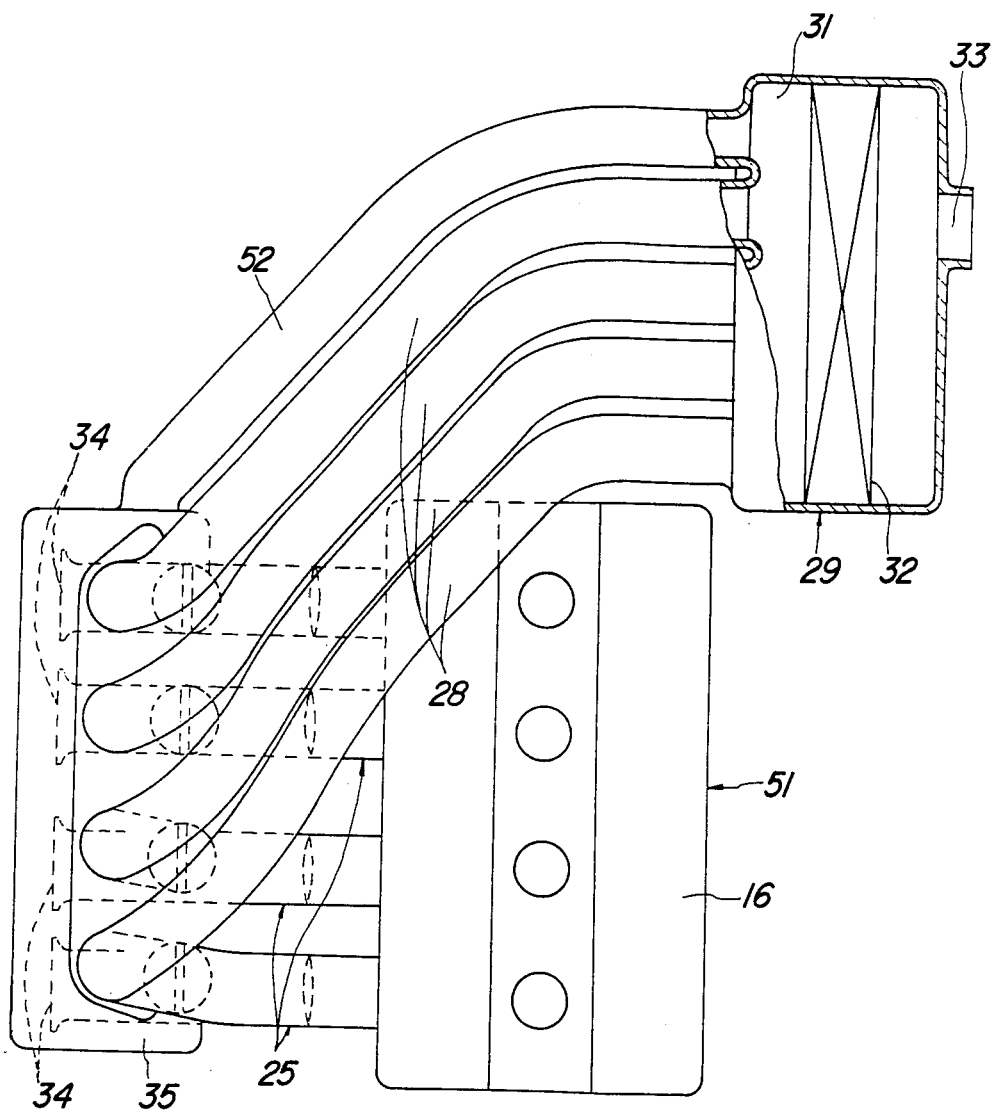
FIG. 5 is a top plan view of the third embodiment.

A third embodiment of the invention is shown in FIGS. 4 and 5 and the engine constructed in accordance with this embodiment is identified generally by the reference numeral 51. The engine 51 has an induction system which is substantially the same as the embodiment of FIGS. 1 and 2 and for that reason those components which are the same as the previously described embodiments have been identified by the same reference numerals and will not be described again in any significant detail. The main difference between this embodiment and the embodiment of FIGS. 1 and 2 is that the plenum chamber 35 is recharged with air directly from the plenum chamber 31 by means of an air inlet tube 52 that extends from the plenum chamber 31 downstream of the filter elements 32 and into the plenum chamber 35. In all other regards, this embodiment is the same as the embodiment of FIGS. 1 and 2 and it is believed that a detailed description of its operation is unnecessary.

It should be readily apparent from the foregoing description that a number of embodiments of the invention have been illustrated and described, each of which provides for good engine running under a wide range of load and speed conditions. In addition, even though the induction systems of the various embodiments have two separate intake systems for each chamber of the engine, there is only one air inlet device and, hence, servicing is simplified and compactness is assured. Although three embodiments of the invention have been illustrated and described, various changes and modifications may be made without departing from the spirit and scope of the invention, as defined by the appended claims.

I claim:

1. In an induction system for an internal combustion engine having a plurality of combustion chambers, a series of first intake passages each having a first effective length for serving a respective one of said combustion chambers, a series of second intake passages each having a second effective length serving a respective one of said combustion chambers, said first induction passages communicating at their inlet ends with a first plenum chamber, said second induction passages communicating at their inlet ends with a second plenum chamber, the effective length of said induction passages being the length between the inlet into the respective plenum chamber and said combustion chamber and the effective lengths of said first and said second intake passages being substantially different from each other, said first intake passages being relatively long and tuned for low speed running and said second intake passages being relatively short and tuned for high speed running, a plurality of first throttle valves for controlling the flow through said second intake passages and a plurality of second throttle valves for controlling the flow through both of said intake passages, said second throttle valves being manually operated, an auxiliary induction passage extending from said second plenum chamber to a point downstream of said second throttle valves, third throttle valve means for controlling the flow through said auxiliary induction passages, and means for providing an atmospheric air inlet only to one of said plenum chambers.

2. In an induction system as set forth in claim 1 wherein one of the plenum chambers receives atmospheric air from the other of the plenum chambers.

3. In an induction system as set forth in claim 2 wherein the atmospheric air inlet supplies the first plenum chamber.

* * * * *